Feb. 20, 1968    K. E. MORAN    3,369,273
APPARATUS FOR EXTRUDING AND FILLING PLASTIC CONTAINERS
Original Filed June 17, 1965    3 Sheets-Sheet 1
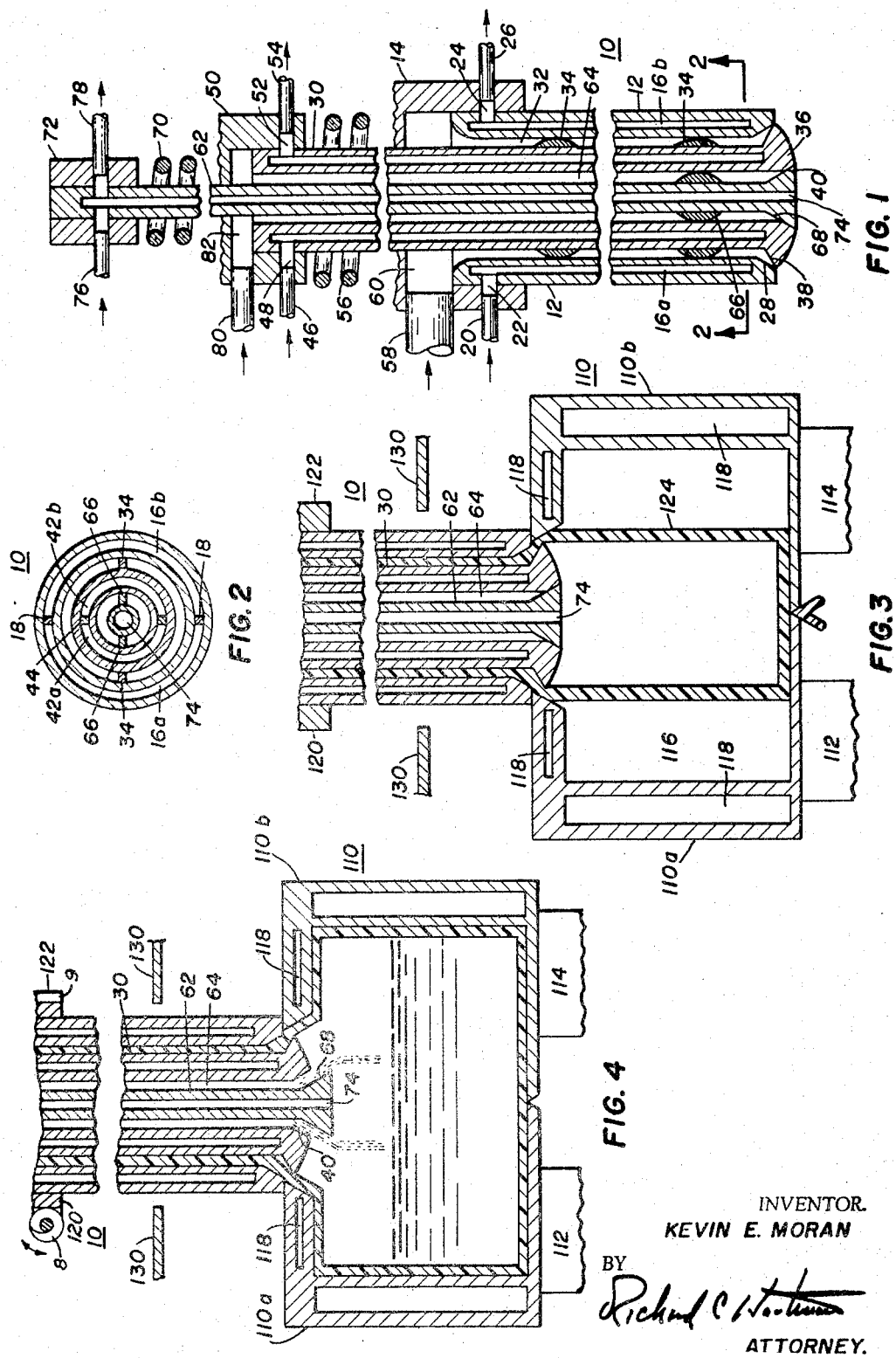
INVENTOR.
KEVIN E. MORAN
BY
ATTORNEY.

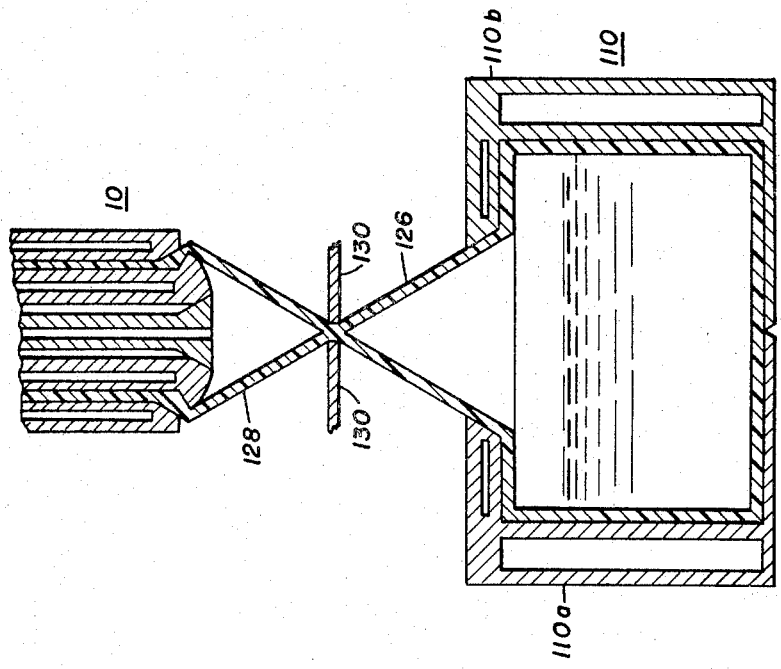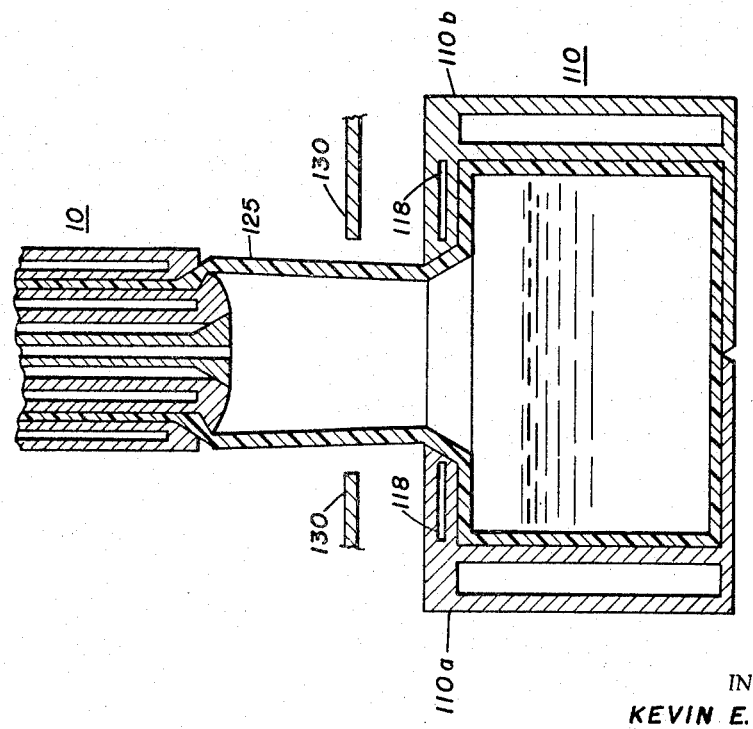

United States Patent Office 3,369,273
Patented Feb. 20, 1968

3,369,273
APPARATUS FOR EXTRUDING AND FILLING PLASTIC CONTAINERS
Kevin E. Moran, Crystal Lake, Ill., assignor, by mesne assignments, to Union Oil Company of California, Los Angeles, Calif., a corporation of California
Original application June 17, 1965, Ser. No. 464,684, now Patent No. 3,311,949, dated Apr. 4, 1967. Divided and this application Nov. 30, 1966, Ser. No. 615,278
3 Claims. (Cl. 18—14)

ABSTRACT OF THE DISCLOSURE

Extrusion apparatus for continuously producing molding and filling blown plastic bottles.

This invention relates to an apparatus for extruding, and filling a hollow plastic container.

It is therefore an object of this invention to provide a novel apparatus for extruding and filling a hollow plastic container.

This and further objects of this invention will become apparent as the description proceeds and reference is made to the accompanying drawings in which:

FIGURE 1 is a cross-sectional view showing the novel extruding device of this invention;

FIGURE 2 is a cross-sectional view of the novel extruding device taken along the line 2—2 in FIGURE 1; and FIGURES 3 to 6 are views, partly in cross-section and partly schematic, depicting the steps in the performance of the novel method.

Figure 7:
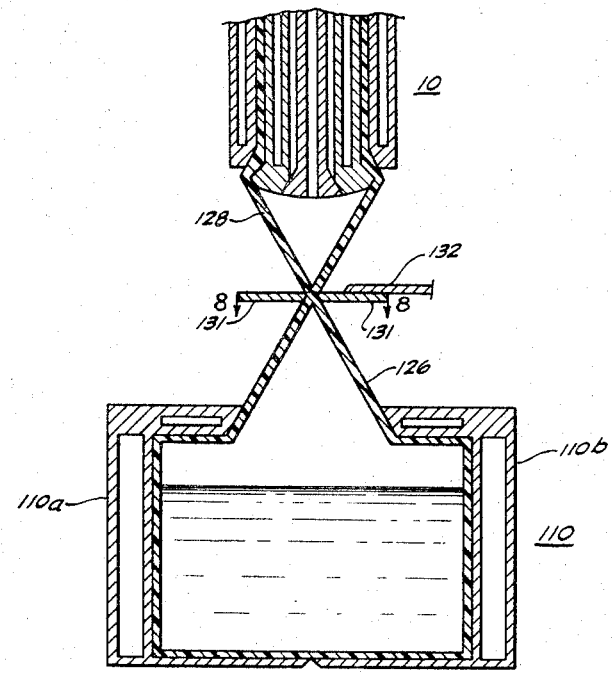
Figure 8:
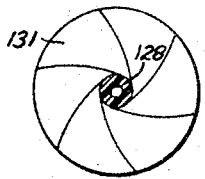

Referring to FIGURES 1 and 2, numeral 10 represents the novel extruding device of this invention comprising cylindrical casing 12 to the top of which is secured inverted cup-shaped member 14. Outer cylindrical tube 12 contains semi-cylindrical chambers 16a and 16b through which a heating medium such as oil or steam is circulated. Heating chambers 16a and 16b are separated from each other by longitudinal spacers 18 which extend from the uppermost portions of heating chambers 16a and 16b to a short distance from the bottoms thereof where openings, not illustrated, connecting heating chambers 16a and 16b are provided. The heating medium introduced through inlet pipe 20 flows through passageway 22, and into heating chamber 16a where it flows downward and enters heating chamber 16b. The heating fluid flows upward in heating chamber 16b, then into passageway 24 and out outlet pipe 26. The lowermost edge of outer cylindrical tube 12 is formed with concave conical surface 28. Reciprocally mounted within outer cylindrical tube 12 and extending out of member 14 in a fluid-tight relationship therewith is intermediate cylindrical tube 30, the outer diameter of which is smaller than the inner diameter of outer cylindrical tube 12 to form annular plastic conduit 32. The outer surface of intermediate cylindrical tube 30 is provided with longitudinally extending spacers 34 which slidably engage the inner surface of outer cylindrical tube 12. The lower portion of intermediate cylindrical tube 30 has frusto-conical closure member 36, the upper surface 38 of which engages concave surface 28 in fluid-tight relationship. The lower surface of closure member 36 is formed with concave bearing surface 40. As in the case of outer cylindrical tube 12, intermediate cylindrical tube 30 is provided with semi-cylindrical heating chambers 42a and 42b separated one from the other by longitudinal separators 44. Longitudinal separators 44 extend from the tops of heating chambers 42a and 42b to the lower portions thereof where openings, not shown, are provided between heating chambers 42a and 42b. The heating medium flows downward in heating chamber 42a after it is introduced through inlet line 46 and passageway 48 in inverted cup-shaped member 50 secured to the top of intermediate cylindrical tube 30. The heating medium flows from heating chamber 42a to 42b through the openings provided in longitudinally extending separators 44, upward in heating chamber 42b, through passageway 52, and thence out outlet pipe 54. Intermediate cylindrical tube 30 is biased upwardly, to hold upper surface 38 of closure member 36 against concave conical surface 28, by compression spring 56 extending between members 14 and 50. Plastic is introduced into extruding device 10 through inlet pipe 58 from where it flows into cylindrical passageway 60, and then into annular plastic conduit 32 where it is kept in a heat-softened condition by the heating medium flowing through heating chambers 16a, 16b, 42a and 42b. Reciprocally mounted within intermediate cylindrical tube 30 is inner cylindrical tube 62 which extends out of member 50 in fluid tight relationship therewith. The outer diameter of inner cylindrical tube 62 is less than the inner diameter of intermediate cylindrical tube 30 to form annular product conduit 64 therebetween. Inner cylindrical tube 62 has longitudinally extending spacers 66 which slidably engage the inner surface of intermediate cylindrical tube 30. The lower portion of inner cylindrical tube 62 has convexly conical surface 68 which can be held in sealing relation against surface 40. Inner cylindrical tube 62 is biased upwardly, to hold convexly conical surface 68 against surface 40, by compression spring 70 extending between member 50 and circular member 72 secured to the upper portion of inner cylindrical tube 62. Inner cylindrical tube 62 has longitudinal air passageway 74 connected to inlet pipe 76 and outlet pipe 78. Inlet pipe 76 and outlet pipe 78 are equipped with valve arrangements, not shown, which automatically open and close them in the proper sequence. The product being packaged is introduced by product inlet line 80 from which it flows through circular passageway 82 and then into annular product passageway 64.

In order to simplify the illustration of the steps in the production of plastic containers in reference to FIGURES 3 to 6, inclusive, the apparatus and means for supplying heated plastic material, heating medium, the product, and air, as well as the mechanism for operating the extruding device, are omitted since such means may readily be provided by one skilled in the art. In addition, certain details have been omitted in the portion of extruding device 10 shown, such as the spacers between the respective tubes. In FIGURE 3, extruding device 10 is shown engaging the opening in the top of mold unit 110 in axial alignment therewith. Mold unit 110 is comprised of separable mold halves 110a and 110b mounted on moveable tables 112 and 114, respectively, to open and close mold unit 110. Mold unit 110 is opened to remove the article produced and closed to form molding cavity 116 which conforms to the shape of the article to be blow-molded. Mold unit 110 is cooled by a cooling medium, such as water, circulating through cooling chambers 118. At the beginning of the cycle, extruding device 10, slidably mounted within guide means 120 and 122, is in a raised position and mold halves 110a and 110b are separated from each other by a distance at least as great as the diameter of the plastic tube to be extruded. Extruding device 10 is lowered to a predetermined level so that it will engage the aperture in mold unit 110 when it is in a closed position. Intermediate cylindrical tube 30 and inner cylindrical tube 62 are then moved downward by application of downward pressure to member 50, and plastic in a heat-softened condition is forced through annular conduit 32 and out of extruding device 10 through the opening between surfaces 28 and 38 to form plastic tube 124. After plastic tube 124 reaches a predetermined length, the extrusion thereof is terminated, but cylindrical tubes 30 and 62 are kept in a downward position in order that plastic tube 124 will be attached to the plastic kept in a heat-softened condition in annular conduit 32. Tables 112 and 114 are then moved to close mold unit 110, thereby pinching and sealing the lower end of plastic tube 124, as shown in FIGURE 3. Air is introduced through conduit 74 to expand plastic tube 124 to the walls of mold cavity 116. It will be evident that any other suitable method of sealing the end of plastic tube 124 can be used. For example, the sealing may be accomplished by the utilization of cup mold halves as described in U.S. Patent 2,175,054.

The container walls then are filled with the product to be contained therein by applying pressure to member 72 to move inner cylindrical tubing 62 further downwardly, as shown in FIGURE 4. With inner cylindrical tube 62 in this position, the product flows through annular product conduit 64 and out of the opening between surfaces 40 and 68. After a predetermined quantity of the product has been introduced into the formed container, inner cylindrical tube 62 is raised by the release of the pressure which was applied to member 72 in order that surface 68 thereof will engage surface 40 in sealing relationship. While the formed container is being filled in such a manner, the valve means for air outlet 78 (FIGURE 1) is opened to vent the displaced air. If the characteristics of the product are such that it will not be adversely affected by the warm plastic container, it can be introduced while the plastic is still warm, thereby serving to reduce the temperature of the plastic container and hasten its solidification. However, should the product be adversely affected by the warm plastic, it will be necessary to cool the plastic container to a satisfactory degree by circulating the cooling medium through chamber 118 before the product is introduced into the container.

After the container body is thus formed and filled, extruding device 10 is raised while continuing to extrude plastic to form cylindrical neck 125 on the container. When this has been accomplished, as shown in FIGURE 5, rotating means in guide members 120 and 122 is actuated to rotate extruding device 10, thereby twisting cylindrical neck 125 to form conical neck 126, as shown in FIGURE 6. Guide means 120 and 122 can include any suitable means for rotating extruding device 10, such as hand-actuated means or a worm-gear drive. As an alternative embodiment, extruding device is only reciprocally mounted within guide means 120 and 122, and tables 112 and 114 include means for rotating mold unit 110. The twisting motion closes conical neck 126 at the apex thereof where it is severed from plastic tube 128 extending out of extruding device 10 by knife blades 130, preferably having V-shaped grooves to engage the apex of neck 126. In still a further embodiment, conical neck 126 can be formed without rotating extruding device 10 and mold unit 110 in relation to each other, by extruding plastic tube 124 through an iris-diaphragm-type plate (which may also have the cross-sectional configuration of elements 130), and closing the aperture thereof after conical neck 126 is formed. The container thus formed is severed from plastic tube 128 by knife blade 132, shown in dotted lines.

The container is kept in mold unit 110 while the cooling medium circulating in chambers 118 and/or the product with which it is filled causes it to harden. Following this, tables 112 and 114 are actuated to open mold unit 110 to permit removal of the completed container, thereby placing mold unit 110 in condition to repeat the operation thus described. The pressure which was applied to intermediate cylindrical tube 30 in order to lower it is released and compression spring 56 raises it to its upper position, thereby closing the opening between surfaces 28 and 36. The raising of intermediate cylindrical tube 30 thereby severs plastic tube 128 from the plastic in annular conduit 32. Extruding device 10 is then lowered to its lower position and the operating cycle is repeated.

Although this invention has been described in relation to specific embodiments, it is contemplated that various modifications may be made without departing from the scope of this invention. For example, hollow plastic articles having conical protrusions can be made from plastic materials without the utilization of the novel extrusion head of this invention. Any of the extrusion devices adapted to extrude moldable material in tubular form and containing means for introducing pressure into the tube, which are known in the art, can be used in combination with the described means for forming the conical protrusion, and the formed container can be filled by any suitable method, such as by the utilization of a hollow needle as hereinbefore described. Although the extruding device was described as having cylindrical-shaped tubes, tubes of any shape can be used. It will be apparent that the annular passageway between the inner and intermediate cylindrical tubes can be divided into two semi-cylindrical passageways by longitudinally-extending separators, with one of the semi-cylindrical passageways being used as a product conduit, while the other is used for venting displaced air. The heating arrangement of the extruder can be modified, such as by providing an electric strip heater around the outer wall thereof. If the plastic which is attached to the plastic in the extruding device is still in a heat-softened condition after the container has been severed therefrom, the steps of severing the attached plastic tube and closing the end of the plastic tube at the beginning of the cycle can be omitted, provided the tube is closed when the container is severed from it.

While this invention has been described for use with thermoplastic material, it is understood that it may be used in making hollow articles from the thermosetting materials when it is necessary to provide heating instead of cooling to set the material and cooling instead of heating to prevent hardening. Illustrative of materials with which this invention may be used are thermoplastic materials which are moldable at moderate temperatures, such as polyethylene, polypropylene, styrene polymers, and vinyl polymers, thermoplastic materials which are moldable only at relatively high temperatures, such as glass, and thermosetting materials, such as urea-formaldehyde resins, diallyl phthalate, and polyester resins. The temperature controls will be modified in accordance with the characteristics of the particular plastic material being used.

The embodiments of the invention in which an exclusive property or privilege is claimed are defined as follows:

1. An extruding device for extruding moldable plastic material in tubular form comprising in combination, an outer tubular member, a second tubular member positioned within said outer member to define a first annular passageway for said moldable plastic material, and an inner tubular member positioned within the second member to define a second open and closeable passageway for product, said inner tubular member being adapted to reciprocate in response to pressure applied to the product and thereby open said passageway and to close the said passageway when the pressure on the product has terminated, the inner tubular member being adapted to convey air to expand the plastic material and to vent compressed air when the expansion of the plastic material has terminated.

2. The extruding device of claim 1 in which the inner tubular member has a convex conical surface adapted to seal the second passageway and a spring is provided at the upper portion of the inner tube to bias the inner tube upwardly and maintain the conical surface normally closed against the second passageway.

3. The extruding device of claim 1 in which compressed air is vented through the inner tubular member.

References Cited

UNITED STATES PATENTS

| | | | |
|---|---|---|---|
| 2,175,054 | 10/1939 | Ferngren et al. | 18—5 |
| 2,958,171 | 11/1957 | Deckers | 18—5 |
| 3,196,592 | 7/1965 | Cheney | 18—5 |

WILBUR L. McBAY, *Primary Examiner.*